(12) United States Patent
Saes (10) Patent No.: US 11,163,347 B2
(45) Date of Patent: Nov. 2, 2021

(54) DIGITAL COMMUNICATION SYSTEM AND A METHOD OF TRANSFERRING POWER AND DATA BETWEEN CIRCUITS OF THE SYSTEM

(71) Applicant: EldoLAB Holding B.V., Son en Breugel (NL)

(72) Inventor: Marc Saes, Edson en Breugel (NL)

(73) Assignee: eldoLAB Holding B.V., Son en Breugel (NL)

( * ) Notice: Subject to any disclaimer, the term of this patent is extended or adjusted under 35 U.S.C. 154(b) by 0 days.

(21) Appl. No.: 16/640,555

(22) PCT Filed: Aug. 29, 2018

(86) PCT No.: PCT/NL2018/050557
§ 371 (c)(1),
(2) Date: Feb. 20, 2020

(87) PCT Pub. No.: WO2019/045562
PCT Pub. Date: Mar. 7, 2019

(65) Prior Publication Data
US 2020/0356151 A1 Nov. 12, 2020

(30) Foreign Application Priority Data
Sep. 1, 2017 (NL) ...................................... 2019474

(51) Int. Cl.
*G06F 1/26* (2006.01)
*G06F 13/20* (2006.01)
(Continued)

(52) U.S. Cl.
CPC ................ *G06F 1/26* (2013.01); *G06F 13/20* (2013.01); *G06F 13/4022* (2013.01); *H02J 7/345* (2013.01)

(58) Field of Classification Search
CPC ............. G06K 19/0723; G06K 7/0008; G06K 19/0701; G06K 19/0704; G06K 19/07758;
(Continued)

(56) References Cited

U.S. PATENT DOCUMENTS 4,949,359 A   8/1990 Voillat
6,239,732 B1 * 5/2001 Cusey ....................... G06F 3/05
                                                            341/120

(Continued)

FOREIGN PATENT DOCUMENTS

DE   202011103664 U1   12/2011
EP       0306934 A2    3/1989

OTHER PUBLICATIONS

Awtrey, D., "Transmitting Data and Power over a One-Wire Bus", Sensors, North American Technology, Peterborough, NH, Feb. 1, 1997, pp. 1-3.

(Continued)

*Primary Examiner* — Faisal M Zaman
(74) *Attorney, Agent, or Firm* — RatnerPrestia (57) ABSTRACT

A method of transferring power and data between a first circuit and a second circuit is described, whereby the second circuit comprises a processing unit having an I/O terminal and an electric energy storage element, the electric energy storage element being configured to be charged by the first circuit via the I/O terminal and configured to power the processing unit, the method comprising:
  establishing a wired communication link between an I/O terminal of the first circuit and the I/O terminal of the second circuit;
  operating the I/O terminal of the second circuit as an output terminal and the I/O terminal of the first circuit as an input terminal;

(Continued)

transmitting data via the I/O terminal of the second circuit to the I/O terminal of the first circuit by modulating an output level of the I/O terminal of the second circuit between a high level and a low level;

determining whether the output level of the I/O terminal of the second circuit corresponds to the high level or the low level and, when the output level corresponds to the high level:

operating the I/O terminal of the first circuit as an output terminal; and raising an output level of the I/O terminal of the first circuit to a level that is at least equal to the high level during at least part of a period when the output level of the I/O terminal of the second circuit corresponds to the high level, thereby charging the electric energy storage element.

17 Claims, 4 Drawing Sheets

(51) Int. Cl.
*G06F 13/40* (2006.01)
*H02J 7/34* (2006.01)

(58) Field of Classification Search
CPC ......... G06K 19/0702; G06K 19/07749; G06K 19/0709; H04B 5/0062; G06F 19/00
USPC ........ 340/10.1, 10.34; 455/333, 41.1, 127.1; 713/300
See application file for complete search history.

(56) References Cited

U.S. PATENT DOCUMENTS

| | | | | |
|---|---|---|---|---|
| 7,741,811 | B2* | 6/2010 | Daio | H02J 50/05 320/122 |
| 2007/0285256 | A1* | 12/2007 | Batra | G08B 13/2462 340/572.8 |
| 2008/0016263 | A1* | 1/2008 | Diab | G06F 13/4072 710/105 |
| 2008/0055052 | A1* | 3/2008 | Chang | H04B 3/54 340/12.32 |
| 2008/0238680 | A1* | 10/2008 | Posamentier | G06K 7/10029 340/572.3 |
| 2009/0261662 | A1* | 10/2009 | Breitfuss | G06K 19/0701 307/149 |
| 2009/0262382 | A1* | 10/2009 | Nobutani | H04L 41/0806 358/1.15 |
| 2011/0125945 | A1* | 5/2011 | Link | H04L 12/10 710/110 |
| 2011/0174874 | A1* | 7/2011 | Poznansky | G06K 19/06206 235/379 |
| 2011/0264033 | A1* | 10/2011 | Jensen | A61M 5/16854 604/65 |
| 2012/0091162 | A1* | 4/2012 | Overhultz | A47F 1/126 221/1 |
| 2013/0305066 | A1* | 11/2013 | Mullins | G06F 1/26 713/310 |
| 2014/0028352 | A1* | 1/2014 | Chung | H03K 3/012 327/77 |
| 2015/0069136 | A1* | 3/2015 | Wu | G06K 19/0709 235/492 |
| 2017/0039402 | A1* | 2/2017 | Iannotti | F01D 21/04 |
| 2018/0041874 | A1* | 2/2018 | Kelly | H04B 5/0031 |
| 2018/0046236 | A1* | 2/2018 | Erturk | G06F 1/26 |
| 2018/0213280 | A1* | 7/2018 | Shah | H04N 21/4432 |

OTHER PUBLICATIONS

International Search Report and Written Opinion for International Application PCT/NL2018/050557, dated Nov. 22, 2018, 10 pages.

* cited by examiner

DIGITAL COMMUNICATION SYSTEM AND A METHOD OF TRANSFERRING POWER AND DATA BETWEEN CIRCUITS OF THE SYSTEM

RELATED APPLICATIONS

This application is a U.S. National Phase Patent Application of International Application No. PCT/NL2018/050557, filed Aug. 29, 2018, which claims priority to Netherlands Application No. NL 2019474, filed Sep. 1, 2017, the disclosures of which are entirely incorporated herein by reference.

FIELD OF THE INVENTION

The invention relates to the field of communication, such as digital communication, by means of a communication link between a first circuit and a second circuit, whereby the second circuit is powered via the communication link to the first circuit and does not comprise a power supply such as a battery, nor is it connected to a power supply.

BACKGROUND OF THE INVENTION

The present invention relates to the field of communication, in particular digital communication between two units or systems or circuits, whereby only one of these units or systems is connected to a power supply or comprises a power supply. The system or unit that is connected to a power supply or that comprises a power supply may e.g. be referred to as a powered system or unit, or a main system. The other one of these units or systems may thus be described as supply-less unit or system. Such supply-less units or circuits may e.g. take the form of an IC tag or IC tag module. Such IC tags may e.g. have a wired interface for communicating with other devices, e.g. a host. Typically, such supply-less circuits or systems include a processor, e.g. an IC or the like, and an energy storage element such as a capacitor. Prior to the supply-less unit or system being capable of communicating to the main system or powered system, the energy storage element needs to be charged. Once this element has been charged, e.g. via a wired connection, the stored energy may be used to power up the IC, whereupon the IC may be configured to transmit data, e.g. by means of digital communication to the main system or powered system. During said communication, the energy storage element will gradually be drained until communication is no longer possible and the energy storage element needs to be charged again.

It is therefore a drawback of known supply-less units or systems that are used for digital communication that the amount of data that can be transmitted without having to recharge the energy storage element is rather limited. Or, in case a comparatively large amount of data needs to be transmitted, a comparatively large energy storage element would be required.

SUMMARY OF THE INVENTION

It would be desirable to provide in a second circuit or system that is used for digital communication that does not require a comparatively large energy storage for powering the circuit. It would also be desirable to increase the autonomy or amount of data that can be transmitted by such a second circuit.

To better address one or more of these concerns, in an aspect of the invention, there is provided a method of transferring power and data between a first circuit and a second circuit, whereby the second circuit comprises a processing unit having an I/O terminal and an electric energy storage element, the electric energy storage element being configured to be charged by the first circuit via the I/O terminal and configured to power the processing unit, the method comprising:

establishing a wired communication link between an I/O terminal of the first circuit and the I/O terminal of the second circuit;

operating the I/O terminal of the second circuit as an output terminal and the I/O terminal of the first circuit as an input terminal;

transmitting data via the I/O terminal of the second circuit to the I/O terminal of the first circuit by modulating an output level of the I/O terminal of the second circuit between a high level and a low level;

determining whether the output level of the I/O terminal of the second circuit corresponds to the high level or the low level and, when the output level corresponds to the high level:

operating the I/O terminal of the first circuit as an output terminal; and raising an output level of the I/O terminal of the first circuit to a level that is at least equal to the high level during at least part of a period when the output level of the I/O terminal of the second circuit corresponds to the high level, thereby charging the electric energy storage element.

In a further aspect of the present invention, there is provided a digital communication system comprising a first circuit and a second circuit, the first circuit comprising:

a processing unit having an I/O terminal and having a power-supply terminal connectable to a power source;

the second circuit comprising:

a processing unit having an I/O terminal connected or connectable to the I/O terminal of the first circuit via a communication link;

an electric energy storage element configured to supply power to the processing unit, the electric energy storage element being configured to be charged via the I/O terminal, whereby the processing unit of the second circuit is configured to:

operate the I/O terminal as an output terminal;

transmit data by modulating an output level of the I/O terminal between a high level and a low level and whereby the processing unit of the first circuit is configured to:

operate the I/O terminal as an input terminal, and, during a transmission of data by the processing unit of the second circuit:

determining whether the output level of the I/O terminal of the second circuit corresponds to the high level or the low level and, when the output level corresponds to the high level:

operating the I/O terminal of the first circuit as an output terminal; and raising an output level of the I/O terminal of the first circuit to a level that is at least equal to the high level during at least part of a period when the output level of the I/O terminal of the second circuit corresponds to the high level, thereby charging the electric energy storage element.

In yet a further aspect of the present invention, there is provided a circuit for use in a digital communication system enabling communication between the circuit and a further circuit, the circuit comprising:

a processing unit having an I/O terminal connectable to an I/O terminal of the further circuit, and having a power-supply terminal connectable to a power source;

whereby the processing unit of the circuit is configured to:

operate the I/O terminal as an input terminal, and, during a transmission of data by the further circuit:

determining whether the output level of the I/O terminal of the further circuit corresponds to a high level or a low level and, when the output level corresponds to the high level:

operating the I/O terminal of the circuit as an output terminal; and raising an output level of the I/O terminal of the circuit to a level that is at least equal to the high level during at least part of a period when the output level of the I/O terminal of the further circuit corresponds to the high level.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
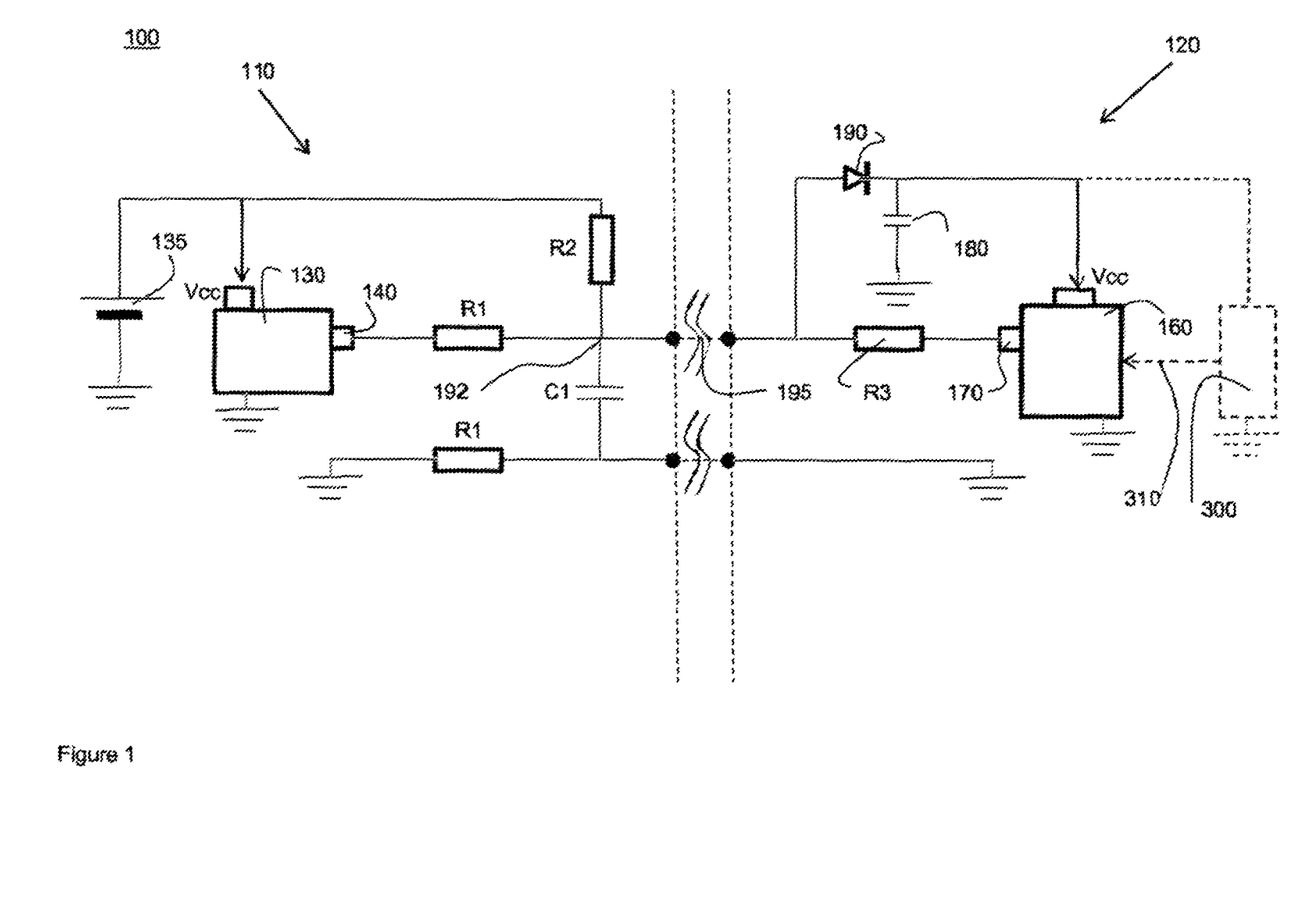
FIG. 1 depicts a communication system according to an embodiment of the present invention.

FIG. 1 depicts a communication system 100 according to an embodiment of the present invention. The present invention relates to methods of performing a communication between a first circuit and a second circuit, whereby the second circuit relies on the first circuit for its power supply and systems enabling such communication methods. The present invention in particular enables the second circuit of such a system to communicate for a longer period of time or enables the second circuit to communicate a similar amount of data as in known systems but requiring less energy storage.

The communication system 100 according to an embodiment of the present invention comprises a first circuit 110 and a second circuit 120. The first circuit 110 comprises a processor, integrated circuit (IC) or processor unit 130 having an I/O terminal 140 e.g. a GPI/O (general purpose input/output) terminal which can be used to transmit data via a communication line 195, e.g. a single line data communication channel, or to receive data via said communication line. In the embodiment as shown, the processing unit 130 further comprises a power supply terminal or power supply pin (Vcc) connected to a power supply 135, e.g. a DC power supply. In the embodiment as shown, the power supply pin is labelled as Vcc, it may also be a VDD pin, depending on the type of processing unit or processor applied. Further, as can be seen, the I/O terminal 140 is connected to the power supply 135 via resistors R1 and R2. The DC power supply may e.g. supply a 5 V voltage to the I/O or GPIO terminal 140 and the power supply terminal Vcc. In the embodiment as shown, it is further assumed that the processing unit 130 can configure the I/O terminal to either operate as an output terminal or as an input terminal, depending on whether data is to be transmitted or is received.

In the embodiment as shown, the second circuit 120 also comprises a processor, integrated circuit (IC) or processing unit 160, the processing unit 160 having an I/O terminal 170 which may e.g. be a similar terminal as GPIO terminal 140 of the first circuit 110. In the embodiment as shown, the second circuit 120 is not connected to a power supply. Rather, in the embodiment as shown, the second circuit comprises an energy storage element 180, in particular a capacitor, which is connected to the I/O terminal 170 via diode 190 and resistor R3. As such, the capacitor can be charged via the I/O terminal 170 by the first circuit 110. The energy storage element 180 is further connected to a power supply terminal or pin Vcc of the processing unit 160 such that, when the energy storage element 180 is sufficiently charged, the processing unit 160 can become operational.

The communication system 100 may be operated in the following modes:

In a first mode, the processing unit of the first circuit 110 is configured to transmit a logical "1" to the second circuit. It is further assumed that in an initial state, capacitor 180 of the second circuit 120 is discharged. In order to transmit the logical "1" the processing unit 130 may e.g. set the I/O terminal 140 as an output terminal, and set the output level to a high level, referred to as H. In case the processing unit 130 is supplied from a 5V supply, the high level at the I/O terminal 140 set as output terminal may be approx. 5 V. When this high level H is applied to the communication line 195, in general the wired connection, between the I/O terminal 140 and the I/O terminal 170, the capacitor 180 can be charged, via the diode 190. At some point, the capacitor 180 will be sufficiently charged to enable the processing unit 160 to start operating, due to the capacitor 180 being connected to the power supply pin Vcc of the processor or processing unit 160 of the second circuit 120.

When the capacitor 180 is sufficiently charged to start operating, the communication system 100 can operate in a second mode, i.e. a data transmission mode from the first circuit to the second circuit. In the second mode, the processing unit 160 may e.g. set the I/O terminal 170 as an input or input terminal (e.g. an high impedance input terminal) and the processing unit 130 may e.g. start communicating with the processing unit 160, e.g. by transmitting a sequence of logical "1"s and "0" s, said sequence e.g. forming a command or data via the communication line 195.

In order to transmit a logical "0", the output level of the I/O terminal 140 can be set to a low level, e.g. close to 0 V, referred to as L.

When such data transmission or communication occurs, the energy storage element 180 can be charged when the output level of the I/O terminal 140 is high. During a low level, the capacitor 180 is isolated from the communication line 195 due to the presence of the diode 190, said diode preventing the capacitor 180 from discharging via the communication line. In order to prevent such discharging, 1 or more unidirectional switches such as controlled switches or diodes can be applied.

However, it can be noted that in case the processing unit 130 would maintain its output level low, capacitor 180 would ultimately be discharged, due to the supply of power to the processing unit 160.

In a third mode, the processing unit 160 of the second circuit 120 may be configured to transmit data or commands to the processing unit 130 of the first circuit 110. In order to operate in such mode, the processing unit 160 may set the I/O terminal 170 as an output terminal while the processing unit 130 may e.g. set the I/O terminal 140 as an input or input terminal (e.g. an high impedance input terminal). In this operating mode, the processing unit 160 may transmit a sequence of logical "1"s and "0"s, said sequence e.g. forming a command or data, by respectively setting the output level of the I/O terminal 170 to a high level or a low level. In an embodiment, the second circuit may comprise further circuitry or may be incorporated in a device. Such a device or further circuitry may e.g. comprise a sensor or an actuator. In such an embodiment, the further circuitry or the actuator or sensor of the device may also need to be powered or supplied via the capacitor 180. In the embodiment as shown, the dotted lines illustrate such an additional circuitry. Such an additional circuit may e.g. comprise a sensor 300, e.g. an environmental sensor or an illumination sensor, whereby said sensor 300 is configured to supply a sensing signal 310, i.e. a signal representative of the sensed characteristic, to the processing unit 160, as indicated by the dotted arrow 310.

As can be seen, the sensor 300 may also be supplied with power from the electric energy storage element 180, in case this is needed. In an embodiment, the second circuit, e.g. forming part of a device including the sensor 300, may be configured to transmit, via the I/O terminal 170 sensor data representative of the sensing signal 310 as received from the sensor 300 to the first circuit 110.

When the second circuit 120 operates in a transmitting mode, the capacitor 180 needs to supply power to both the processing unit 160 and the communication line 195 (e.g. via an internal connection between the power supply pin Vcc and the terminal 130), and optionally to any further circuitry in case the second circuit 120 is e.g. incorporated in a device, e.g. including a sensor or the like.

As a result, during the transmission of data, e.g. a sequence of data bits, i.e. a sequence of logical "1"s and "0"s, the high level output of the I/O terminal 170 may gradually decay. In case the required transmission would take too long, the processing unit 160 may be starved from power to operate and will seize transmitting, thus corrupting the communication.

In order to avoid or mitigate this seizing of transmitting, the present invention provides a manner to keep powering the second circuit 120 via the communication line 195, even when the processing unit 170 of the second circuit is operating in a transmitting mode.

In an embodiment of the present invention, this can be realized as follows:

During a transmission of a sequence of logical "1"s and "0"s by the processing unit 160 of the second circuit 120, the voltage on the communication line can be considered to be modulated between a high level H (e.g. representing a logical "1") and a low level L (e.g. representing a logical "0"). Assuming that the capacitor 180 can e.g. be charged to approx. 3 V, a high level may e.g. be close to said 3 V, whereas a low level voltage may e.g. be close to 0 V.

As will be appreciated by the skilled person, in electronic logic a distinction is made between 'positive logic' and 'negative logic'. In positive logic, a logical "1" is mapped to a physical high voltage H and a logical "0" is mapped to a physical low voltage L, i.e. '1' 'H' and '0'=='L'. In negative logic, a logical "1" is mapped to a physical low voltage L and a logical "0" is mapped to a physical high voltage H, i.e. '1'=='L' and '0'=='H'.

Within the present description, the mapping of positive logic is adopted. A reverse mapping is however to be considered within the scope of the present invention as well. In accordance with an embodiment of the present invention, the processing unit 130 of the first circuit 110 may be configured to:

detect the input level at the I/O terminal 140 of the first circuit 110 and, when this level is considered to be 'high', perform the steps of:
   operating the I/O terminal of the first circuit as an output terminal;
   raising an output level of the I/O terminal 140 of the first circuit to a level at least equal to the high level; and, when the input level is considered low,
   operating the I/O terminal of the first circuit back as an input terminal.

By doing so, the discharging of the energy storage element 180 of the second circuit 120 can be mitigated or even reversed; i.e. the energy storage element 180 may be charged during the transmission, in case the output level of the I/O terminal of the first circuit is raised above the high level value that is detected. In the embodiment shown in FIG. 1, the charging of the energy storage element 180 would require a voltage at least equal to the voltage drop across R1, the forward voltage Vf of the diode 190 and the voltage on capacitor 180. In an embodiment, the I/O terminal 140 is raised to the level of outputting a logical "1".

In an embodiment of the present invention, the processing unit 130 of the first circuit 110 may be configured to detect when the voltage level at the I/O terminal 140 is higher than a predetermined or set threshold, thus enabling to detect when the output level of the processing unit 160 is set to "high". Similarly, the first circuit 110 may be configured to detect when the voltage level at the I/O terminal 140 is lower than a predetermined or set threshold, thus enabling when the output level of the processing unit 160 is set to "low".

In an embodiment, the data bits that are transmitted, i.e. logical "1"s and "0" s, are represented by respectively maintaining the output level for a predetermined period to the high level or the low level.

Figure 2:
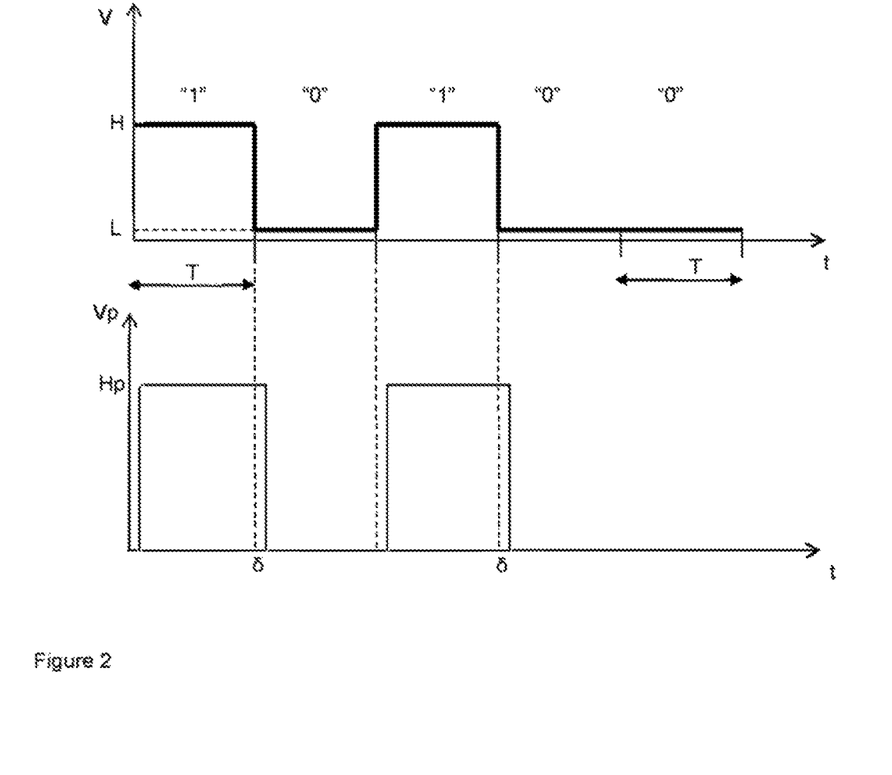
FIG. 2 depicts a sequence of data bits that are binary coded and an output level for an I/O terminal of a first circuit for powering a second circuit during the transmission of the sequence according to a first embodiment of the invention.

An example of such a sequence of logical "1"s and "0"s as a function of time is schematically shown in FIG. 2, top graph.

In FIG. 2 top graph, a variation of the output level V at the I/O terminal 170 of the processing unit 160 is schematically shown as a function of time t. As can be seen, when the output level is maintained at a comparatively high level H during a period T, this is considered to represent a logical "1"; when the output level is maintained at a comparatively low level L during a period T, this is considered to represent a logical "0". Such an encoding of data may be referred to as binary encoding. The sequence as shown thus represents a data sequence 1 0 1 0 0. The period T may e.g. be associated or may correspond to a period of a clock signal of the second circuit.

In accordance with an embodiment of the present invention the processing unit 130 of the first circuit 110 may be configured to, upon detection that the input level at the I/O terminal 140 of the first circuit 110 is high, perform the steps of:

operating the I/O terminal of the first circuit in a transmitting mode;

raising an output level of the I/O terminal of the first circuit to a level at least equal to the high level.

This is schematically illustrated in the bottom graph of FIG. 2. The bottom graph of FIG. 2 schematically illustrates the output level Vp of the I/O terminal 140 of the first circuit during the same period as the sequence 1 0 1 0 0 is transmitted by the processing unit 160. As can be seen, the output level Vp is raised to a level Hp when it is detected that the output level V of the processing unit 160 is high (H), and lowered again when it is detected that the output level V of the processing unit 160 is low (L). By doing so, the discharging of the capacitor 180 can be mitigated or even reversed. In particular, in case the output level Vp exceeds the output level H combined with the voltage drop over the diode 190, the capacitor 180 may be charged during the transmission of the logical "1"s.

As can be seen, in the embodiment as shown, there is a small delay δ between the transition from H to L for the output of the processing unit 160 and the transition from Hp to zero for the output of the processing unit 130. As a result, it may occur, in the embodiment as shown, that the processing unit 130 is outputting a level Vp (e.g. approx. 5 V) while the processing unit 160 is in a transmitting mode and transmitting a low level (L). Such a situation may give rise to an excessive current in case no measures are taken. Such an excessive current may e.g. be harmful for the processing unit 160 when transmitting. As such, in an embodiment of the present invention, the processing unit 160 of the second circuit 120 of the communication system according to the present invention may be dimensioned to withstand such currents.

With respect to the detection of the level at which the processing unit 160 is transmitting, it can be pointed out that, with reference to FIG. 1, the voltage at node 192, or the voltage across resistor R1 can be considered. When the processing unit 130 is outputting a level Hp while the processing unit 160 is transmitting a high level (H), the voltage at node 192 will be comparatively high & the voltage drop across R1 will be comparatively low. When the processing unit 130 is outputting a level Hp while the processing unit 160 is transmitting a low level (L), the voltage at node 192 will e.g. be at an intermediate voltage, e.g. 2-3 V, whereas the voltage drop across R1 will be comparatively high, due to the aforementioned excessive currents.

As such, it can be detected when the processing unit 160 starts transmitting a low level (L), upon which the processing unit 130 can be configured to go back to the receiving mode, i.e. the I/O terminal 140 can be set as an input terminal.

Alternatively, the processing unit 130 can be configured to go back to the receiving mode before the processing unit 160 switches from a high level (H) output to the low level (L) output. This can e.g. be realized when the processing unit 130 knows the period T during which the output level of the processing unit 160 is maintained. This period T may e.g. be preprogrammed in the processing unit 130 or may be determined by measuring the time between high-to-low and low-to-high transitions, e.g. in case the processing unit 160 transmits a 1 0 1 0 sequence of data bits. Such a time can e.g. be measured when a first bit of every message from the second circuit 120 is transmitted or during first initial communications. As mentioned, the period T may be associated with a period of a clock signal applied by the second circuit.

Figure 3:
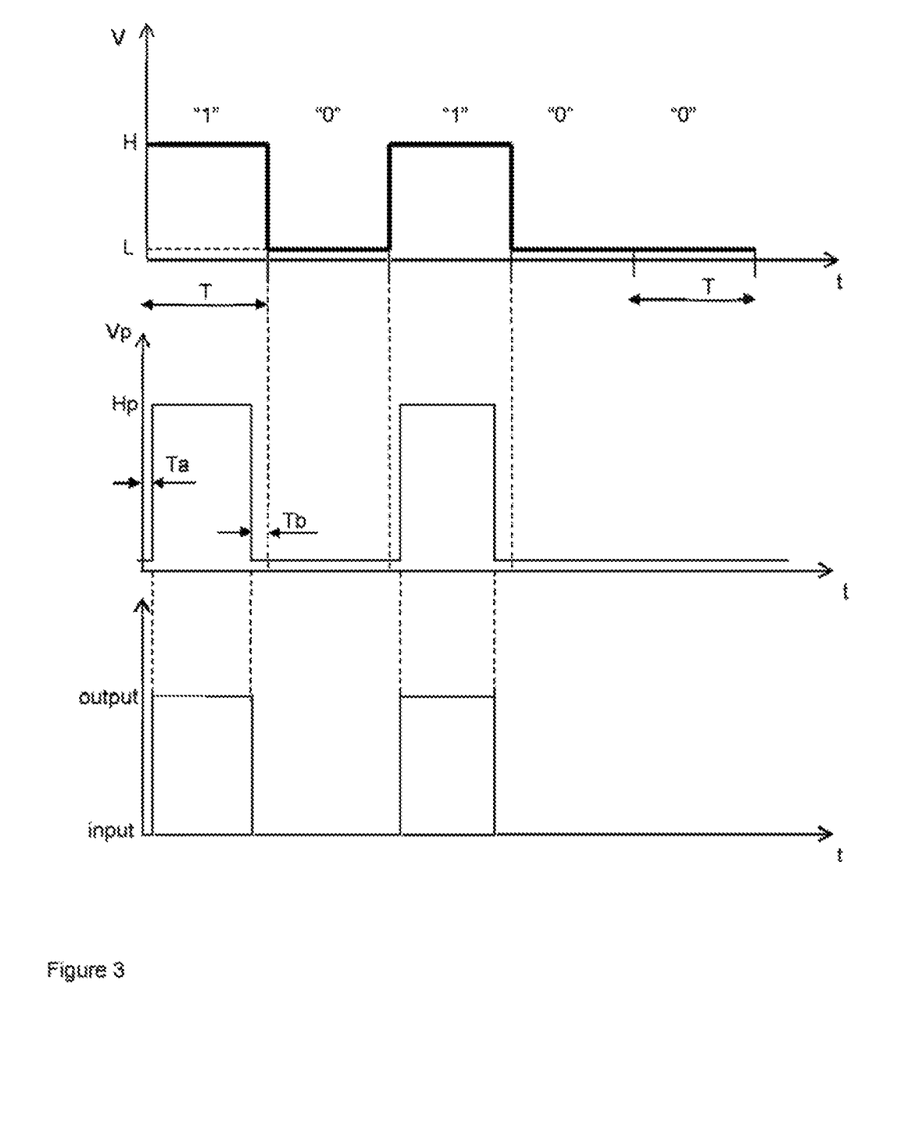
FIG. 3 depicts a sequence of data bits that are binary coded and an output level for an I/O terminal of a first circuit for powering a second circuit during the transmission of the sequence according to a second embodiment of the invention.

This is schematically illustrated in FIG. 3.

In FIG. 3 top graph, a variation of the output level V at the I/O terminal 170 of the processing unit 160 is schematically shown as a function of time t. As can be seen, when the output level is maintained at a comparatively high level H during a period T, this is considered to represent a logical "1"; when the output level is maintained at a comparatively low level L during a period T, this is considered to represent a logical "0". Such an encoding of data may be referred to as binary encoding. The sequence as shown thus represents a data sequence 1 0 1 0 0. The period T may e.g. be associated or may correspond to a period of a clock signal of the second circuit.

In order to ensure that the processing unit 130 is operated back in the receiving mode before the processing unit 160 switches from a high level (H) output to the low level (L), the processing unit 130 may be configured to, in an embodiment of the present invention:

determine when the output level of the I/O terminal of the second circuit switches from the low level to the high level and, when the output level has switched to the high level:

operating the I/O terminal of the first circuit as an output terminal; and         raising an output level of the I/O terminal of the first circuit to a level that is at least equal to the high level during a period that is smaller than the period during which the output level of the I/O terminal of the second circuit corresponds to the high level.

By doing so, the processing unit 130 is operated back in the receiving mode before the processing unit 160 switches from a high level (H) output to the low level (L).

This is schematically illustrated in the middle graph of FIG. 3. The middle graph of FIG. 3 schematically illustrates the output level Vp of the I/O terminal 140 of the first circuit during the same period as the sequence 1 0 1 0 0 is transmitted by the processing unit 160. As can be seen, the output level Vp is raised to a level Hp when it is detected that the output level V of the processing unit 160 is high (H). In the graph, the raising of the output level Vp follows the output level V with a delay of Ta.

FIG. 3 bottom graph schematically shows the corresponding operating state of the I/O terminal 140. As can be seen, initially, at t=0 and during period Ta, the I/O terminal 140 is operated as an input terminal, indicated by 'input', which enables detecting when the output level of the processing unit 160 becomes high, H. When this is detected, the I/O terminal 140 is operated as an output terminal, indicated by 'output', and the output level of the I/O terminal 140 of the first circuit (Vp) is raised to the high level Hp, after a delay Ta. The high level Hp can e.g. be kept higher than the high level H of the processing unit 160 during a period that is shorter than the period T. In particular, the operating state of the I/O terminal 140 is changed back to input terminal at t=T−Tb and, as a result, the output level of the I/O terminal 140 of the first circuit (Vp) is lowered again to the low level Lp. The I/O terminal 140 has thus been operating as an output terminal during a period T−Ta−Tb. By doing so, it can be ensured that the I/O terminal 140 operates as an input terminal again, before the end of period T, i.e. before the output level V of the processing unit 160 is low (L).

When the I/O terminal 140 operates as an input terminal, the voltage level Vp at the I/O terminal 140 substantially corresponds to the low level L as transmitted by the processing unit 160.

As illustrated in FIGS. 2 and 3, in case the processing unit 160 is configured to transmit data bits, i.e. logical "1"s and "0"s, whereby the logical "1"s and "0"s are represented by respectively maintaining the output level for a predetermined period to the high level or the low level, the processing unit 130 of the first circuit 110 may be configured to charge the energy storage device 180 of the second circuit 120, during the transmission of the logical "1" s. Note that, during the transmission of the logical "0" s, the I/O terminal 170 is kept at a low level such that the capacitor 180 cannot be charged due to the presence of the unidirectional switch (diode 190) between the I/O terminal 170 and the capacitor 180. As such, it can be pointed out that the charging capabilities in the example given in FIGS. 2 and 3 actually depend on the data that is to be transmitted. In particular, in case the data bits would contain a large amount of "0" s, larger than the amount of "1" s, the capacitor 180 can only be charged for less than 50% of the time.

Even if the amount of "1"s and "0"s would be balanced, it could still be cumbersome to transmit a sequence of data bits containing a large amount of successive "0" s, since the transmission of such a sequence could drain the capacitor 180 or at least discharge it to a level at which the processing unit 160 cannot operate anymore.

In order to avoid this situation, the first circuit 110 may e.g. contain an extra circuit or powerful I/O terminal enabling the charging of capacitor 180 in less than T or e.g. T/2 such that the capacitor 180 would always be charged with a balanced number of "1"s and "0"s and thus only be starved when a very long sequence of "0" is transmitted in a non-Manchester encoding like system.

Figure 4:
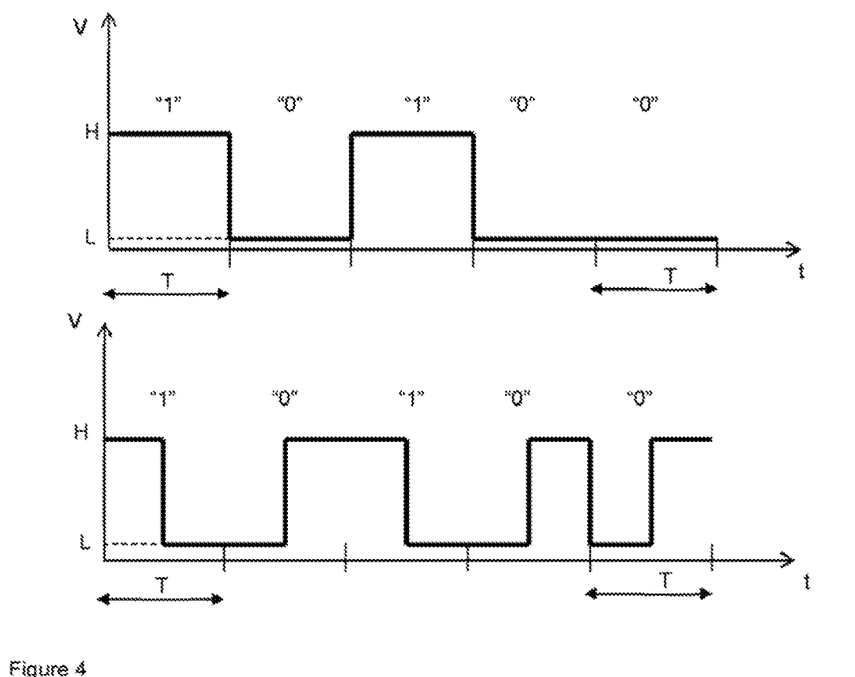
FIG. 4 depicts a sequence of data bits in a binary encoded format and Manchester encoded format.

In another embodiment, in order to avoid such a situation, the processing unit 160 of the second circuit as applied in an embodiment of the present invention may be configured to transmit data based on a Manchester encoding or differential Manchester encoding of the data bits that are to be transmitted. In such an encoding, logical "1"s and "0"s are no longer represented by a high level and a low level as is done using binary encoding. Rather, in a Manchester encoding of data bits, a data bit, either a logical "1" or a logical "0", may be represented by either a low to high transition or a high to low transition. FIG. 4 schematically depicts both a binary encoding and a Manchester encoding of a data sequence 1 0 1 0 0. In the top graph, a binary encoding of a data sequence 1 0 1 0 0 is schematically shown, whereby a logical "1" is represented by maintaining a high level (H) during a period T and whereby a logical "0" is represented by maintaining a low level (L) during a period T. In the bottom graph, a Manchester encoding of the same sequence is schematically shown, whereby a logical "1" is represented by a high to low transition and a logical "0" is represented by a low to high transition. More specifically, a logical "1" is represented by maintaining the output level of the I/O terminal at a high level (H) during a period T/2, followed by maintaining the output level of the I/O terminal at a low level (L) during a period T/2, while a logical "0" is represented by maintaining the output level of the I/O terminal at a low level (L) during a period T/2, followed by maintaining the output level of the I/O terminal at a high level (H) during a period T/2. As such, irrespective of whether a logical "1" or a logical "0" is to be transmitted, the output level of the I/O terminal will be high (H) during a period T/2. During these periods, the processing unit 130 of the first circuit 110 may be configured to:

operating the I/O terminal 140 of the processing unit 130 as an output terminal; and raising an output level of the I/O terminal 140 to a level that is at least equal to the high level (H), thereby charging the electric energy storage element 180 of the second circuit 120.

As such, by using a Manchester or Manchester like encoding, the electric energy storage element 180 may be charged during approx. 50% of the time, whereby said 50% can be considered to be uniformly spread over time; i.e. there will be no periods longer than a period T during which the output level remains low. As such, when the charging method as described above is applied during the periods T/2 when the output level of the I/O terminal of the processing unit 160 of the second circuit 120 is high, the capacitor 180 may be charged during substantially 50% of the duration of a transmission of data. Due to this charging during transmission, the amount of data that can be transmitted before the capacitor 180 is discharged or insufficiently charged for proper operation may be significantly increased. Alternatively, such a charging could enable the electric energy storage element to be scaled down, reducing the size and cost of the second circuit.

The present invention may also be embodied as a circuit for use in a digital communication system enabling communication between the circuit and a further circuit, e.g. a further circuit without a power supply such as a battery or without being connected or connectable to a power supply. Such a circuit according to the present invention may e.g. comprise a processing unit having an I/O terminal connectable to an I/O terminal of the further circuit, and a power-supply terminal connectable to a power source. In an embodiment, the processing unit of the circuit may be configured to:

operate the I/O terminal of the circuit as an input terminal, and, during a transmission of data by the further circuit:

determining whether the output level of the I/O terminal of the further circuit corresponds to a high level or a low level and, when the output level corresponds to the high level:

operating the I/O terminal of the circuit as an output terminal; and raising an output level of the I/O terminal of the circuit to a level that is at least equal to the high level during at least part of a period when the output level of the I/O terminal of the further circuit corresponds to the high level.

As will be clear from the above description, such a circuit may advantageously be applied for the charging of energy storage elements that may e.g. be present in the further circuit, during a data transmission of the further circuit.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention. The mere fact that certain measures are recited in mutually different dependent claims does not indicate that a combination of these measures cannot be used to advantage.

The term coupled, as used herein, is defined as connected, although not necessarily directly, and not necessarily mechanically.

A single processor or other unit may fulfil the functions of several items recited in the claims.

The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/ dynamic load library and/or other sequence of instructions designed for execution on a computer system.

A computer program may be stored and/or distributed on a suitable medium, such as an optical storage medium or a solid-state medium supplied together with or as part of other hardware, but also be distributed in other forms, such as via the Internet or other wired or wireless telecommunication systems.

The invention claimed is:

1. A method of transferring power and data between a first circuit and a second circuit, whereby the second circuit comprises a processing unit having an I/O terminal and an electric energy storage element, the electric energy storage element being configured to be charged by the first circuit via the I/O terminal and configured to power the processing unit, the method comprising:
    establishing a wired communication link between an I/O terminal of the first circuit and the I/O terminal of the second circuit;
    operating the I/O terminal of the second circuit as an output terminal and the I/O terminal of the first circuit as an input terminal;
    transmitting data via the I/O terminal of the second circuit to the I/O terminal of the first circuit by modulating an output level of the I/O terminal of the second circuit between a high level and a low level; and
    determining whether the output level of the I/O terminal of the second circuit corresponds to the high level or the low level and, when the output level corresponds to the high level:
        operating the I/O terminal of the first circuit as an output terminal; and
        raising an output level of the I/O terminal of the first circuit to a level that is at least equal to the high level during at least part of a period when the output level of the I/O terminal of the second circuit corresponds to the high level, thereby charging the electric energy storage element of the second circuit during the transmitting data via the I/O terminal of the second circuit to the I/O terminal of the first circuit.

2. The method according to claim 1, further comprising:
    operating the I/O terminal of the first circuit back as an input terminal when the output level corresponds to the low level.

3. The method according to claim 1, further comprising:
    operating the I/O terminal of the first circuit back as an input terminal prior to the output level of the I/O terminal of the second circuit corresponding to the low level.

4. The method according to claim 1, wherein the step of modulating the output level of the I/O terminal of the second circuit between the high level and the low level includes modulating the output level in accordance with a Manchester encoding or differential Manchester encoding.

5. The method according to claim 1, wherein the step of operating the I/O terminal of the first circuit back as an input terminal is based on a period of a clock signal of the second circuit.

6. A digital communication system comprising a first circuit and a second circuit, the first circuit comprising:
    a processing unit having an I/O terminal and having a power-supply terminal connectable to a power source;
    the second circuit comprising:
        a processing unit having an I/O terminal connected or connectable to the I/O terminal of the first circuit via a communication link;
        an electric energy storage element configured to supply power to the processing unit, the electric energy storage element being configured to be charged via the I/O terminal,
        whereby the processing unit of the second circuit is configured to:
            operate the I/O terminal as an output terminal;
            transmit data by modulating an output level of the I/O terminal between a high level and a low level and
        whereby the processing unit of the first circuit is configured to:
            operate the I/O terminal as an input terminal, and, during a transmission of data by the processing unit of the second circuit:
                determining whether the output level of the I/O terminal of the second circuit corresponds to the high level or the low level and, when the output level corresponds to the high level:
                    operating the I/O terminal of the first circuit as an output terminal; and
                    raising an output level of the I/O terminal of the first circuit to a level that is at least equal to the high level during at least part of a period when the output level of the I/O terminal of the second circuit corresponds to the high level, thereby charging the electric energy storage element of the second circuit during the transmission of data via the I/O terminal of the second circuit to the I/O terminal of the first circuit.

7. The digital communication system according to claim 6, wherein the electric energy storage element is connected to the I/O terminal via a unidirectional switch such as a diode.

8. The digital communication system according to claim 6, wherein the electric energy storage element is a capacitor.

9. The digital communication system according to claim 6, wherein the second circuit comprises a power supply terminal, the electric energy storage element being connected to the power supply terminal.

10. The digital communication system according to claim 6, wherein the second circuit is incorporated in a device.

11. The digital communication system according to claim 10, wherein the device comprises a sensor, the sensor being configured to provide a sensing signal to the processing unit.

12. The digital communication system according to claim 11, wherein the processing unit is configured to transmit sensor data representative of the sensing signal via the I/O terminal to the first circuit.

13. The digital communication system according to claim 11, wherein the sensor comprises an environmental sensor or an illumination sensor.

14. The digital communication system according to claim 6, wherein the processing unit of the second circuit is configured to modulating the output level of the I/O terminal of the second circuit between the high level and the low level in accordance with a Manchester encoding or differential Manchester encoding.

15. The digital communication system according to claim 6, wherein the processing unit of the first circuit is configured to:
   operating the I/O terminal of the first circuit back as an input terminal when the output level corresponds to the low level.

16. The digital communication system according to claim 15, wherein the processing unit of the first circuit is configured to operating the I/O terminal of the first circuit back as an input terminal based on a period of a clock signal of the second circuit.

17. A circuit for use in a digital communication system enabling communication between the circuit and a further circuit, the circuit comprising:
   a processing unit having an I/O terminal connectable to an I/O terminal of the further circuit, and having a power-supply terminal connectable to a power source;
   whereby the processing unit of the circuit is configured to:
      operate the I/O terminal as an input terminal, and, during a transmission of data by the further circuit:
         determining whether the output level of the I/O terminal of the further circuit corresponds to a high level or a low level and, when the output level corresponds to the high level:
            operating the I/O terminal of the circuit as an output terminal; and
            raising an output level of the I/O terminal of the circuit to a level that is at least equal to the high level during at least part of a period when the output level of the I/O terminal of the further circuit corresponds to the high level during the transmission of data via the I/O terminal of the further circuit to the I/O terminal of the circuit.

* * * * *